United States Patent
Frank et al.

(12) 
(10) Patent No.: US 6,261,483 B1
(45) Date of Patent: Jul. 17, 2001

(54) MICROCAPSULES OF LOW-FORMALDEHYDE MELAMINE/FORMALDEHYDE RESINS

(75) Inventors: Gabriele Frank, Mannheim; Ralf Biastoch, Speyer; Matthias Kummer, Weisenheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/366,745

(22) Filed: Aug. 4, 1999

(30) Foreign Application Priority Data

Aug. 4, 1998 (DE) ................................. 198 35 114

(51) Int. Cl.⁷ .............................. B01J 13/02; B01J 13/04; B01J 13/20
(52) U.S. Cl. ........................... 264/4.1; 264/4.3; 264/4.33; 264/4.7; 427/213.3; 427/213.31; 427/213.33; 427/213.34; 428/402.2; 428/402.21
(58) Field of Search .......................... 264/4.1, 4.3, 4.33, 264/4.7; 427/213.3, 213.31, 213.33, 213.34; 428/402.2, 402.21

(56) References Cited

U.S. PATENT DOCUMENTS

| 4,223,141 | 9/1980 | Hoenel et al. ..................... 544/196 |
| 4,406,816 | 9/1983 | Sliwka ................................ 521/69 |
| 4,963,461 | * 10/1990 | Takahashi et al. .................. 430/138 |

FOREIGN PATENT DOCUMENTS

| 36 29 714 | 3/1987 | (DE) . |
| 0 008 683 | 3/1980 | (EP) . |
| 0 026 914 | 4/1981 | (EP) . |
| 0 562 344 | 9/1993 | (EP) . |
| 2 177 997 | 2/1987 | (GB) . |

OTHER PUBLICATIONS

Derwent Publications, AN 1981–78629D, JP 56 115634, Sep. 10, 1981.

* cited by examiner

*Primary Examiner*—Nathan M. Nutter
(74) *Attorney, Agent, or Firm*—Oblon, Spivak, McClelland, Maier & Neustadt, P.C.

(57) ABSTRACT

Microcapsules are prepared by polycondensation of a melamine/formaldehyde resin mixture in water, in which essentially water-insoluble material forming the capsule core is dispersed, in the presence of an anionic protective colloid, by a process wherein the melamine/formaldehyde resin mixture is composed of:

a) an aqueous solution of a condensate of
  a1) 1 mol of melamine,
  a2) from 2 to 5 mol of formaldehyde and
  a3) from 0 to 0.5 mol of a melamine derivative which can undergo an addition or condensation reaction with formaldehyde and
  a4) from 1 to 5 mol of a $C_1$–$C_3$-alkanol and
b) from 0.01 to 1 mol of a water-soluble primary, secondary or tertiary amine or ammonia.

7 Claims, No Drawings

MICROCAPSULES OF LOW-FORMALDEHYDE MELAMINE/FORMALDEHYDE RESINS

BACKGROUND OF THE INVENTION

1. Field of the Invention

The present invention relates to a process for the preparation of microcapsules by polycondensation of a melamine/formaldehyde resin mixture in water, in which the material forming the capsule core is dispersed, in the presence of an anionic protective colloid, and the melamine/formaldehyde resin mixtures used therein. The present invention furthermore relates to the microcapsules obtained by the novel process and to their use for pressure-sensitive recording systems.

2. Description of the Background

Microcapsules which are used for pressure-sensitive recording materials must be impermeable and must also have a narrow size distribution, since otherwise, when they are further processed, deficiencies occur in the copying papers. The encapsulation process and the starting materials therefore have to meet high requirements.

As a rule, partially methylated resins of 1 mol of melamine and from 5 to 6 mol of formaldehyde are used as starting materials for the wall material since they lead to particularly impermeable and uniform capsules.

However, such resins have a relatively high residual formaldehyde content, which it is intended to avoid since the microcapsules are often prepared directly by the paper maker.

Melamine/formaldehyde resins converted to the methyl ether form and prepared with a relatively low formaldehyde content are disclosed in EP-A-0 008 683 for the preparation of coatings. When used as a starting material for microcapsules, however, they are unsatisfactory since they lead to nonuniform capsule walls.

SUMMARY OF THE INVENTION

It is an object of the present invention to provide a process for the preparation of microcapsules which has a lower total pollution by formaldehyde. In particular, it is intended to provide a melamine/formaldehyde resin mixture which is distinguished by a low formaldehyde content and nevertheless can be processed to give good microcapsules. In addition, the microcapsule dispersions should likewise have a low formaldehyde content.

We have found that this object is achieved by a process for the preparation of microcapsules by polycondensation of a melamine/formaldehyde resin mixture in water, in which the material forming the capsule core is dispersed, by choosing a melamine/formaldehyde resin mixture which is composed of a) an aqueous solution of a condensate which is composed of
  a1) 1 mol of melamine
  a2) from 2 to 5 mol of formaldehyde and
  a3) from 0 to 0.5 mol of a melamine derivative which can undergo an addition or condensation reaction with formaldehyde and
  a4) from 1 to 5 mol of a $C_1$–$C_3$-alkanol and
b) from 0.01 to 1 mol of a water-soluble primary, secondary or tertiary amine or ammonia.

DESCRIPTION OF THE PREFERRED EMBODIMENTS

Melamine/formaldehyde resin converted to the methyl ethyl form and having a molar ratio of from 6.5 to 8 mol of formaldehyde per mol of melamine are generally known, and a process for their preparation is described, for example, in EP-A-0 008 683.

The formaldehyde may be used both as paraformaldehyde and, preferably, in aqueous solution.

As a rule, the melamine is methylolated with an aqueous formaline solution which contains from 30 to 50% by weight of formaldehyde and was brought to pH of from 7 to 10, in a molar ratio of from 1:3.5 to 1:7 over a period of from 5 minutes to one hour at from 60 to 110° C., and the resulting suspension of the methylolmelamine is etherified with from 10 to 20 mol of a $C_1$–$C_3$-alkanol per mol of melamine at from 30 to 60° C. in the presence of a strong acid. Since atmospheric pressure is generally employed, the formaldehyde content of the resulting resin mixture is lower than that of the mixture of the starting materials. The alkanol is also used in excess, since the etherified content is lower.

For the condensation reaction of melamine with formaldehyde, it is possible to add from 0 to 0.5 mol, per mol of melamine, of a melamine derivative which can undergo an addition or condensation reaction with formaldehyde.

Guanamines, such as benzoguanamine and acetoguanamine, bisguanamines, such as adipo-, glutaro- or methylolglutarobisguanamine, and compounds which contain a plurality of fused aminotriazine nuclei are suitable for this.

Suitable alcohols for the etherification are propanol, ethanol and in particular methanol.

After the end of the etherification, working up is effected in a known manner, i.e. the mixture is neutralized or rendered weakly alkaline and the excess alcohol is distilled off, generally under reduced pressure, together with the water contained in the batch.

All water-soluble primary, secondary or tertiary amines and ammonia are suitable as component b) of the melamine/formaldehyde resin mixture.

Examples of suitable amines are:

monoalkylamines, such as methylamine, ethylamine, 3-propylamine, isopropylamine, butylamine, sec-butylamine, isobutylamine, 1,2-dimethylpropylamine or 2-ethylhexylamine, dialkylamines, such as dimethylamine, diethylamine, dipropylamine, diisopropylamine, dibutylamine, diisobutylamine, di-sec-butylamine, di-2-ethylhexylamine, N-methyl-n-butylamine or N-ethyl-n-butylamine, alkoxyalkylamines, such as 2-methoxyethylamine, bis-2-methoxyethylamine, 3-methoxypropylamine, 3-ethoxypropylamine or 3-(2-ethylhexyloxy)propylamine, trialkylamines, such as trimethylamine, triethylamine, tri-n-propylamine, tributylamine, N,N-dimethylethylamine, N,N-dimethylisopropylamine, N,N-dimethylbenzylamine, and hydroxylamines, such as mono- or diethanolamine, mono- or dipropanolamine, mono- or diisopropanolamine, N-mono- or N,N-di($C_1$–$C_4$-alkyl)ethanolamines, -propanolamines or -isopropanolamines, such as N-mono- or N,N-dimethylethanolamine, -propanolamine or -isopropanolamine, N-mono- or N,N-diethylethanolamine, -propanolamine or -isopropanolamine, N-mono- or N,N-dipropylethanolamine, -propanolamine or -isopropanolamine, N-mono- or N,N-diisopropylethanolamine, -propanolamine or -isopropanolamine or N-mono- or N,N-dibutylethanolamine, -propanolamine or -isopropanolamine, N-($C_1$–$C_4$-alkyl)diethanolamines, -dipropanolamines or -diisopropanolamines, such as N-methyldiethanolamine, -dipropanolamine or -diisopropanolamine, N-ethyldiethanolamine, -dipropanolamine or -diisopropanolamine, N-propyldiethanolamine, -dipropanolamine or -diisopropanolamine, N-isopropyldiethanolamine, -dipropanolamine or -diisopropanolamine or N-butyldiethanolamine, -dipropanolamine or -diisopropanolamine, triethanolamine, tripropanolamine, triisopropanolamine, N-(2-hydroxyethyl)pyrrolidine, N-(2- or 3-hydroxypropyl)pyrrolidine, N-(2-hydroxyethyl)piperidine, N-(2- or 3-hydroxypropyl) piperidine, N-(2-hydroxyethyl)morpholine, N-(2- or 3-hydroxypropyl)morpholine, N-(2-hydroxyethyl) piperazine, N-(2- or 3-hydroxypropyl)piperazine or N,N-dimethyl- or N,N-diethyl-N-(5-hydroxy-3-oxapentyl) amine.

The novel melamine/formaldehyde resin mixtures consisting of the etherified condensate a) and one or more water-soluble primary, secondary or tertiary amines or ammonia in the abovementioned amounts can advantageously be used for the preparation of microcapsules.

A melamine/formaldehyde resin mixture comprising an etherified condensate a) composed of a1) 1 mol of melamine a2) from 2.5 to 4.5 mol of formaldehyde and a3) from 0 to 0.2 mol of a melamine derivative which can undergo an addition or condensation reaction with formaldehyde, and the amine b)

is preferably chosen.

Melamine/formaldehyde resin mixtures comprising $C_1$–$C_6$-alkylamines and/or $C_1$–$C_6$-alkanolamines are likewise preferred.

In particular, those melamine/formaldehyde resin mixtures which contain from 0.01 to 0.5 mol, especially from 0.01 to 0.1, mol, based on 1 mol of melamine, of a water-soluble primary, secondary or tertiary amine or ammonia are preferred.

The novel melamine/formaldehyde resin mixtures are suitable as starting materials for the microencapsulation and lead to microcapsules having good properties. Since these mixtures have from the outset a much lower content of free formaldehyde than the conventional starting materials, they are easier to handle. Moreover, the novel melamine/formaldehyde resins permit microencapsulation in the presence of various protective colloids and hence a large variation for the process.

The microencapsulation is generally carried out by emulsifying the core material to be encapsulated in an aqueous solution of the anionic protective colloid and the aqueous solution of the melamine-formaldehyde resin, which has a pH of from 3 to 6.5, to give fine droplets, it being possible to adjust the droplet size according to the intended use.

In this first step, the microcapsules form. Their shell is then hardened by increasing the temperature to >50° C. Since it is an aqueous dispersion, hardening should be carried out up to 100° C., preferably 85° C., as the upper limit. The hardening is carried out at different rates depending on the pH of the dispersion, dispersions having a relatively low pH of from 3 to 5 hardening optimally in the temperature range from 65 to 85° C. Above 50° C., however, the hardening is clearly observable even in the only weakly acidic to neutral pH range.

The optimum temperatures, depending on the pH for the two steps of capsule formation and hardening, can be readily determined by a simple series of experiments.

Suitable core material for the microcapsules comprises liquid, solid or gaseous substances which are insoluble in water to essentially undissolved, examples being liquids, such as alkylnaphthalines, partially hydrogenated terphenyls, aromatic hydrocarbons such as xylene, toluene and dodecylbenzene, aliphatic hydrocarbons, such as gasoline and mineral oil, chloroparaffins, fluorohydrocarbons, natural oils, such as peanut oil and soybean oil, and adhesives, flavors, perfume oils, monomers, such as acrylates or methacrylates, styrene, active ingredients, such as crop protection agents, red phosphorus, inorganic and organic pigments, for example iron oxide pigments, and moreover solutions or suspensions of colorants and especially of dye precursors and pigments in hydrocarbons, such as alkylnaphthalines, partially hydrogenated terphenyl, dodecylbenzene and other high-boiling liquids.

Preferably used anionic protective colloids are water-soluble sulfo-containing homo- or copolymers. Sulfo-containing homo- or copolymers which have a K value according to Fikentscher or from 100 to 170 or whose viscosity is from 200 to 5000 mPa.s (measured in 20% strength by weight aqueous solution at 23° C. using a Brookfield RVT apparatus, spindle 3, at 50 rpm) are preferably chosen.

Polymers having a K value of from 115 to 150 or whose viscosity is from 400 to 4000 mPa.s are preferred. Such protective colloids are described in EP-A-0 026 914 and EP-A-0 562 344.

Polymers of sulfoethyl (meth)acrylate, of sulfopropyl (meth)acrylate, of vinylsulfonic acid and of 2-acrylamido-2-methylpropanesulfonic acid alone as homopolymers or as a mixture with one another in the form of copolymers are advantageous. Polymers of 2-acrylamido-2-methylpropanesulfonic acid are preferred since microcapsules having very good properties are formed in their presence. 2-Acrylamido-2-methyl-propanesulfonic acid also has the advantage that it can be readily polymerized to give polymers having desired K values. The polymers are present in the form of the free acid or, preferably, in the form of the alkali metal salts. Other suitable sulfo-carrying polymers are copolymers which are composed of said sulfo-carrying monomers and $C_1$-to $C_3$-alkyl acrylates, hydroxy-$C_2$- to $C_4$-alkyl acrylates, such as methyl, ethyl, n-propyl or isopropyl acrylate, hydroxypropyl acrylate and/or N-vinylpyrrolidone. Copolymers of 2-acrylamido-2-methylpropanesulfonic acid, sulfoethyl or sulfopropyl (meth)acrylate or vinylsulfonic acid are described in EP-A-0 562 344, the content of which is hereby expressly incorporated by reference.

According to this, particularly preferred protective colloids are obtained by copolymerizing 40–75% by weight of 2-acrylamido-2-methylpropanesulfonic acid, sulfoethyl or sulfopropyl (meth)acrylate or vinylsulfonic acid, 10–30% by weight of acrylic acid or methacrylic acid, 10–50% by weight of methyl or ethyl acrylate or methacrylate or N-vinylpyrrolidone and 0.5–5% by weight of styrene or $C_4$–$C_{18}$-alkyl acrylate or methacrylate.

Among the copolymers, those with 2-acrylamido-2-methylpropanesulfonic acid as sulfo-carrying comonomers are preferred.

The sulfo-carrying homo- and copolymers are prepared by known processes.

The amount of the water-soluble, sulfo-containing polymers used is as a rule from 1 to 5.5, preferably from 1.5 to 4.5, % by weight, based on the aqueous phase. The optimum amount of the water-soluble sulfo-carrying polymer is influenced on the one hand by the polymer itself and on the other hand by the reaction temperature, the desired microcapsule size and the melamine/formaldehyde resin mixture. The optimum required amount of the water-soluble polymer can be readily determined by a simple series of experiments.

Depending on the size of the capsules to be prepared, the core material is dispersed in a known manner, as described, for example, in EP-A-0 026 914.

The conditions which are optimum for the specific case, such as temperature, pH and stirrer speed can be readily determined by a few experiments.

In a preferred procedure, from 10 to 200% by weight, based on the melamine/formaldehyde resin, of urea are added before the hardening, which takes place at above 50° C. This addition can be effected both before and after the formation of the microcapsule dispersion. Preferably, the urea solution is metered in together with the aqueous solution of the anionic protective colloid.

Microcapsule dispersions containing from 15 to 60% by weight of microcapsules can be prepared by the novel process. The microcapsules are individual capsules. By means of suitable conditions during the dispersing, capsules having diameters in the range from 1 to 50 $\mu$m or larger can be prepared. The very narrow size distribution of the capsules is particularly advantageous. This also applies to the range from 1 to about 8 $\mu$m, which is particularly suitable for the production of pressure-sensitive recording systems and reaction copying papers. The capsules obtained by the process according to the present invention are therefore also suitable for the preparation of self-contained papers in which the dye precursor in capsules and the electron acceptor required for color formation are applied one on top of the other or as a mixture on the paper surface.

Inspite of the high concentration of capsules and the high molecular weight of the water-soluble, sulfo-containing polymers, the capsule dispersions have a very low viscosity and can therefore also be rapidly filtered through mesh sieves having a mesh size of from 25 to 40 mm. In the filtration, it is found that the yield of microcapsules in the novel process is very high and is in most cases more than 98%.

These novel microcapsule dispersions, in particular those additionally treated with urea, have an extremely low formaldehyde content. Particularly surprising, however, is the fact that the formaldehyde content is also low in the products obtained by further processing, such as the coated papers.

The novel microcapsules obtained by the novel process using the melamine/formaldehyde resin mixtures have good impermeability and uniform size.

The examples which follow illustrate the novel process. In the examples, parts and percentages are by weight, unless stated otherwise.

Measuring methods used

I) Measurements of formaldehyde in microcapsule dispersions according to DIN 16746

The formaldehyde present in solution in the prepared (hardened) dispersion was determined by this method of measurement. It is based on the reaction of sodium sulfite solution of formaldehyde and back-titration with iodine solution. The stated percentage of formaldehyde content is based on the total amount of microcapsule dispersion.

II) Determination of the impermeability of a microcapsule dispersion (spray test)

The microcapsule dispersion was diluted with water in the ratio 1:1 and applied by means of the Erichson coater (gap width 30 mm) to the CF layer of a standard CP paper. The paper was dried for 30 minutes at room temperature. It was then sprayed uniformly but not too thickly with dye precursor solvent from a spray can. After storage for 2 hours away from direct sunlight, the resulting discoloration is measured with a reflection photometer (ELREPHO®, from Zeiss) (tristimulus value Y) in comparison with the untreated CF paper. The smaller the numerical value for the discoloration, the more impermeable are the capsules.

III) Determination of the intensity of the copy of a paper coated with a microcapsule coating slip Coating paper having a weight of 50 g/m$^2$ was coated by means of a wire coater of 24 $\mu$m gap width using an automatic applicator with a coating slip which was obtained by thoroughly homogenizing 8.75 g of water, 8.25 g of microcapsule dispersion, 1.30 g of a ground cellulose as a spacer (Arbocel BSM 55) and 1.30 g of 50% strength by weight commercial binder dispersion based on a copolymer of styrene and butyl acrylate (Acronal® S 320 D) so that, 30 minutes after application and drying in the air, a coating weight of about 8 g/m$^2$ was obtained (CB paper, coated back). Samples of the same size, having a minimum size of 70×60 mm, were cut from the CB paper, a standard phenol CF paper (coated front) and an uncoated paper corresponding to the standard base paper.

A sample of the CB paper to be tested was placed with the coated side facing downward on a sample of the standard CF paper with the coated side facing upward. Two samples of the uncoated standard paper were placed on top of this. The sandwich was clamped in an electric typewriter so that the back of the standard CF paper rested on the typewriter roller. The striking force of the typewriter was set to 3 and the letter "w" was typed on an area measuring about 50×50 mm. The typescript thus obtained was then stored in the dark for 30 minutes.

The reflectance RY of the w field of the treated CF paper and of an untreated CF paper was then measured with the reflection photometer (ELREPEO, from Zeiss). The difference is stated as the IG value. In each test, a standard (resin of Comparative Example 2, Preparation Process B1, homopolymer of 2-acrylamido-2-methylpropanesulfonic acid as protective colloid) was also tested. The IG value differences relative to the standard (negative values: less intense typescript than standard, positive values: more intense typescript than standard) are stated in the table.

IV) Determination of the coefficient of friction of a paper coated with a microcapsule coating slip a) A sample of the CB paper to be tested was fixed with the coated side upward on a substrate of synthetic leather. A sample of the standard CF paper was placed thereon with the coated side downward. The friction tester was then placed in the vicinity of the edge of the CF paper and was loaded with four weights. The specific load thus generated is 2.1 N/cm$^2$. The loaded CF paper was then slowly drawn manually with the friction tester over the total length (22 cm) of the CB paper. Its felt-coated surface must rest completely on the substrate. The CF paper treated in this manner was stored for 30 minutes in the dark.

The reflectant RY of the paper treated in this manner and of an untreated paper was then measured. In each test, the standard (see IV) was also tested. The IG differences relative to the standard (negative values: less friction-sensitive than standard, positive values: more friction-sensitive than standard) are stated in the table.

V) Solids content

The solids content stated in the examples is determined by drying (4 hours at 105° C.) and is composed essentially of the microcapsules and the water-soluble polymer. The capsule diameters were determined subjectively under the microscope, and objectively using a Malvern Sizer. The capsule diameters are stated in $\mu$m as a D(50) value (50% of the integral curve).

The viscosity of the capsule dispersion is stated as an efflux time in seconds of a dispersion from the DIN cup with a 4 mm nozzle (DIN 53211). The viscosity of the 20% strength solutions of the water-soluble polymers containing strong acidic groups, e.g. sulfo groups, was measured at 23° C. using a Brookfield RVT apparatus with spindle 3 at 50 rpm. The K value was determined according to Fikentscher (Cellulosechemie 13 (1932), 58 et seq.) using a 0.5% strength solution in water.

VI) Determination of the reactivity of the melamine/formaldehyde resin

A mixture of 35 g of melamine/formaldehyde resin, 35 g of protective colloid and 200 g of water is heated to 50° C. in the course of 10 minutes in a 250 ml beaker while stirring. 7.5 ml of a 1% strength by weight formic acid are then added to the mixture. The mixture is homogenized for 15 seconds and the time until visible turbidity occurs is then determined. Melamine/formaldehyde resin mixture

EXAMPLE 1

0.4 part of a 25% strength by weight aqueous sodium hydroxide solution was added to 407 parts of a 40% strength by weight aqueous formaldehyde solution, a pH of 8.2 being established. After the addition of 170 parts of melamine, the mixture was heated to 90° C. and stirred at this temperature until the melamine had dissolved to give a clear solution. After cooling to 72° C., 672 parts of methanol were added. The contents of the flask acquired a milky turbid appearance. 8.1 parts of a 30% strength by weight aqueous nitric acid were added and stirring was carried out at a pH of 5.2 at 50° C. for 45 minutes. After the addition of 6.1 parts of a 25% strength by weight aqueous sodium hydroxide solution, a pH of 6.9 was established and about 740 parts of methanol/water were distilled off under atmospheric pressure up to 90° C. With application of reduced pressure (about 80 mbar), a further 130 parts of methanol were distilled off. After the addition of 75 parts of demineralized water and 1.3 parts of diethanolamine, 460 parts of resin (melamine/formaldehyde/methanol=1/3.6/2.2) were obtained.

| | |
|---|---|
| Nonvolatile constituents (2 h/120° C.): | 70.3% |
| Viscosity (20° C.): | 718 mPa.s |
| Free formaldehyde (DIN 16746): | 0.42% |
| Reactivity: | 40 min. |

COMPARATIVE EXAMPLE 1

0.6 part of a 25% strength by weight aqueous sodium hydroxide solution was added to 783 parts of 40% strength by weight aqueous formaldehyde solution, after which a pH of 8.3 resulted. After the addition of 0.5 part of Borax, 170 parts of melamine were metered in. After heating to 80° C., the mixture was stirred at said temperature until the contents had reached a milky turbid consistency. 777 parts of methanol were added and the temperature was brought to 68° C. After the addition of 2.9 parts of oxalic acid, the pH was 3.8. Stirring was carried out at 68° C. for 20 minutes, the solution becoming clear. After the addition of 11.0 parts of a 25% strength by weight aqueous sodium hydroxide solution, a pH of 7.8 resulted. About 1250 ml of methanol/water were distilled off between 60 and 100° C. After 100° C. had been reached, stirring was carried out for a further 10 minutes at this temperature. After application of reduced pressure of about 80 mbar, a further 60 ml were distilled off, the internal temperature decreasing to 50° C. The viscosity was brought to 200–350 mPa.s by adding 57 parts of demineralized water. 585 parts of resin (melamine/formaldehyde/methanol=1/5.3/3.4) were obtained.

| | |
|---|---|
| Nonvolatile constituents (2 h/120° C.): | 74.1% |
| Viscosity (20° C.): | 306 mPa.s |
| Free formaldehyde (DIN 16746): | 3.25% |
| Reactivity: | 67 min. |

COMPARATIVE EXAMPLE 2

0.4 part of a 25% strength by weight aqueous sodium hydroxide solution was added to 407 parts of 40% strength by weight aqueous formaldehyde solution, after which a pH of 8.2 resulted. After the addition of 170 parts of melamine the mixture was heated to 90° C. and stirred at this temperature until the melamine had dissolved to give a clear solution. After cooling to 72° C., 672 parts of methanol were added. The contents of the flask then acquired a milky turbid appearance. 8.1 parts of a 30% strength by weight aqueous nitric acid were added and stirring was carried out at a pH of 5.2 at 50° C. for 45 minutes. After the addition of 6.1 parts of a 25% strength by weight aqueous sodium hydroxide solution, a pH of 6.9 was established and about 740 parts of methanol/water were distilled off under atmospheric pressure up to 90° C. A further 130 parts of methanol were distilled off under reduced pressure (about 80 mbar). After the addition of 75 parts of demineralized water, 460 parts of resin melamine/formaldehyde/methanol=1/3.6/2.2) were obtained.

| | |
|---|---|
| Nonvolatile constituents (2 h/120° C.): | 70.3% |
| Viscosity (20° C.): | 718 mPa.s |
| Free formaldehyde (DIN 16746): | 0.46% |
| Reactivity: | 20 min. |

General method for the preparation of microcapsule dispersions

A) Preparation of the dye precursor solution 385 g of a solvent mixture consisting of 80% by weight of diisopropylnaphthaline (KMC oil from RKS) and 20% by weight of a diluent component (Shellsol D 100) were initially taken in a beaker or storage vessel and stirred. 15 g of a dye precursor mixture producing a blue copy (Pergascript® blue I-2RN, Pergascript blue S-RB and Pergascript red I-6B, from CIBA) were added to this mixture, and the mixture was heated to about 105° C. while stirring. The clear solution was kept at about 100° C. for a further 45 minutes.

For a dye precursor solution producing a black copy, a solution was prepared according to the above method using the following starting materials: 380 g of a solvent mixture comprising 70% by weight of diisopropylnaphthaline (KMC oil) and 30% by weight of a diluent component (Shellsol D 100) and 20 g of a dye precursor mixture producing a black copy (e.g. Pergascript blue I-2RN, Pergascript green I-2GN, Pergascript black I-R and Pergascript red I-6B).

B1) Preparation of a 40% strength by weight dispersion 580 g of water (demineralized or drinking water), 80 g of a 20% strength by weight aqueous solution of a protective colloid and 86 g of a 70% strength by weight aqueous solution of the melamine/formaldehyde resin mixture were introduced, while stirring slowly, into a cylindrical 2 l stirred vessel having an integral high-speed dispersing unit.

The speed of the dissolver was then increased to such an extent that thorough mixing was achieved. With continued thorough mixing, 400 g of dye precursor solution were then slowly added. Heating was carried out at 28–30° C. and the dissolver speed was brought to 6000 rpm. 16 g of 10% strength by weight formic acid was then added, a pH of from 3.6 to 3.8 resulting. After about 35–45 minutes, capsules formed. As soon as the desired capsule size had been reached, the speed of the dissolver was reduced to 2000 rpm and the capsule dispersion was stirred for a further hour at 28–30° C. and 2000 rpm.

For hardening, the capsule dispersion was heated to 75° C. and, on reaching the temperature, was kept at 75° C. for two hours. After the end of the hardening time, the batch was cooled to about 40° C. and was neutralized by adding 6 g of NaOH (50% strength by weight) or 14.2 g of diethanolamine (80% strength).

B2) Preparation of a 50% strength by weight dispersion 400 g of water, 100 g of a 20% strength by weight aqueous solution of a protective colloid and 110 g of a 70% strength by weight aqueous solution of the melamine/formaldehyde resin mixture were introduced, while stirring slowly, into a cylindrical 2 l stirred vessel having an integral high-speed dispersing unit.

The speed of the dissolver was now increased to such an extent that thorough mixing was achieved. with continued thorough mixing, 500 g of dye precursor solution were then slowly added. Heating was carried out at 28–30° C. and the dissolver speed was brought to 6000 rpm.xg at 10% strength by weight formic acid were then added and the dissolver speed was reduced to 3000 rpm. After about 20 minutes, capsules formed. As soon as the desired capsule size had been reached, the speed of the dissolver was reduced to 2000 rpm and the capsule dispersion was stirred for half an hour at 28–30° C. and 2000 rpm.

For hardening, the capsule dispersion was heated to 75° C. and, on reaching the temperature, was kept at 75° C. for two hours. After the end of the hardening time, the batch was cooled to about 40° C. and was neutralized by adding 6.5 g of NaOH (50% strength by weight) or 17.2 g of diethanolamine (80% strength by weight).

Both 40% strength by weight and 50% strength by weight capsule dispersions were prepared. Capsules producing both blue and black copies were tested.

EXAMPLE 2–6

50% strength by weight dispersions were prepared according to Preparation Method B2, using the amount of formic acid stated in Table 1. Accordingly, only 4–5 g of 50% strength by weight sodium hydroxide solution were required for the final neutralization of the capsule dispersion. The melamine/formaldehyde resin mixtures used were prepared according to Example 1 using the amines shown in each case in Table 1.

EXAMPLE 7

A 40% strength by weight dispersion was prepared according to Preparation Method B1.

The resin of Example 1 (1/3.6/2.2) was chosen as the melamine/formaldehyde resin mixture, but 1.3 parts of triethanolamine were added to said resin.

TABLE 1

Performance characteristics of the microcapsule dispersions of Examples 2–7

| Ex. | Amine | Protective colloid | HCOOH 10% strength [g] | D50 [μm] | I [%] | II IG | III IG | IV IG |
|---|---|---|---|---|---|---|---|---|
| 2 | TEA | S | 19 | 4.7 | 0.78 | 1.8 | −1 | −6 |
| 3 | DEA | S | 18 | 4.3 | 0.74 | 2.0 | −2 | −7 |
| 4 | DEEA | S | 15 | 5.6 | 0.76 | 5.4 | 1 | 4 |
| 5 | TEA | S | 15 | 4.7 | 0.68 | 6.6 | 1 | 3 |
| 6 | DEA | S | 14 | 5.1 | 0.68 | 4.7 | 2 | 2 |
| 7 | TEA | PA | 10 | 11.3 | 0.62 | 2.4 | | |

TEA = Triethanolamine
DEA = Diethanolamine
DEEA = Diethylethanolamine
PA = Polymer of 2-acrylamido-2-methylpropanesulfonate (Na salt) according to Example 1, EP-A-0 026 914), viscosity: 1000 mPa.s, K value: 155, as protective colloid
S = Copolymer of 2-acrylamido-2-methylpropanesulfonate, methyl acrylate, acrylic acid and styrene (according to Example 1, EP-A-0 562 344)
I = Formaldehyde content according to DIN 16746
II = Spray test (impermeability of the microcapsules)
III = Intensity of the copy
IV = Coefficient of friction

COMPARATIVE EXAMPLE V3 and V4

Microencapsulation was carried out similar to Examples 2–7, but without the novel melanie/formaldehyde resin mixture and instead with the melamine/formaldehyde resin of comparative Example V2 (melamine/formaldehyde/methanol=1/3.6/2.2). The microcapsule dispersion formed foam.

TABLE 2

| Ex. | rpm | Protective colloid | HCOOH [g] | D50 [μm] | I [%] | II IG | III IG | IV IG |
|---|---|---|---|---|---|---|---|---|
| V3 | 5000 | S | 11 | 5.0 | — | 2.7 | 0.0 | −4.4 |
| V4 | 4000 | S | 10 | 3.9 | 0.63 | 1.7 | −2.2 | −5.0 | rpm = Revolutions per minute

COMPARATIVE EXAMPLE V5

Microencapsulation carried out similarly to Example 7, likewise with the polymer of 2-acrylamido-2-methylpropanesulfonate as protective colloid, coagulated after 40 minutes although the capsules were prepared using a higher speed.

Comparative Examples V6 and V7

A 40% strength by weight dispersion was prepared according to Preparation Method B1. The resin of Comparative Example V1 (1/5.3/3.4) was chosen as the melamine/formaldehyde resin.

TABLE 3

| Ex. | Protective colloid | D50 [μm] | I [%] | II IG | III IG | IV IG |
|---|---|---|---|---|---|---|
| V6 | PA | — | 1.06 | 3.6 | — | — |
| V7 | PA | 5.9 | 1.12 | 3.9 | −1.4 | −2.2 |

We claim:

1. A process for the preparation of microcapsules by polycondensation of a melamine/formaldehyde resin mixture in water, in which the material, which is a water-insoluble or essentially undissolved gas, solid or liquid, forming the capsule core is dispersed, in the presence of an anionic protective colloid, wherein the melamine/formaldehyde resin mixture is composed of:

a) an aqueous solution of a condensate which is composed of
   a1) 1 mol. of melamine,
   a2) from 2 to 5 mol. of formaldehyde,
   a3) from 0 to 0.5 mol. of a melamine derivative which can undergo an addition or condensation reaction with formaldehyde, and
   a4) from 1 to 5 mol. of a $C_1$–$C_3$-alkanol, and
b) from 0.01 to 1 mol. of a water-soluble primary, secondary or tertiary amine or ammonia.

2. A process as claimed in claim 1, wherein a condensate which is composed of
   a1) 1 mol of melamine,
   a2) from 2.5 to 4.5 mol of formaldehyde and
   a3) from 0 to 0.2 mol of a melamine derivative which can undergo an addition or condensation reaction with formaldehyde and
   a4) from 1.5 to 4.5 mol of a $C_1$–$C_3$-alkanol
is chosen for the melamine/formaldehyde resin mixture.

3. A process as claimed in claim 1, wherein a $C_1$–$C_6$-alkylamine and/or $C_1$–$C_6$-alkanolamine is chosen for the melamine/formaldehyde resin mixture.

4. A process as claimed in claim 1, wherein the anionic protective colloid used is a copolymer containing
   from 40–75% by weight of
      2-acrylamido-2-methylpropanesulfonic acid, sulfoethyl or sulfopropyl (meth)acrylate or vinylsulfonic acid,
   from 10–30% by weight of acrylic acid or methacrylic acid,
   from 10–50% by weight of methyl or ethyl acrylate or methacrylate or N-vinylpyrrolidone and from 0.5–5% by weight of styrene, $C_4$–$C_{18}$-alkyl acrylate or $C_4$–$C_{18}$-alkyl methacrylate.

5. A microcapsule prepared by the process of claim 1.

6. A process as claimed in claim 1, wherein said encapsulated core material is a member selected from the group consisting of alkylnaphthalenes, partially hydrogenated terphenyl and terphenyl derivatives, aromatic hydrocarbons, aliphatic hydrocarbons, chloroparaffins, fluorohydrocarbons, natural oils, adhesives, flavors, perfume oils, monomers, crop protection agents, red phosphorus, organic and inorganic pigments, solutions or suspensions of colorants in hydrocarbons and dodecylbenzene.

7. A process for the preparation of microcapsules by polycondensation of a melamine/formaldehyde resin mixture, which forms the shell of the microcapsules, in water, in which the material, which is a water-insoluble or essentially undissolved gas, solid or liquid, forming the capsule core is dispersed, in the presence of an anionic protective colloid and from 10 to 200% by weight, based on the amount of melamine/formaldehyde resin, of urea, thereby forming microcapsules, wherein the melamine/formaldehyde resin mixture is composed of:

a) an aqueous solution of a condensate which is composed of
   a1) 1 mol. of melamine,
   a2) from 2 to 5 mol. of formaldehyde,
   a3) from 0 to 0.5 mol. of a melamine derivative which can undergo an addition or condensation reaction with formaldehyde, and
   a4) from 1 to 5 mol. of a $C_1$–$C_3$-alkanol, and
b) from 0.01 to 1 mol. of a water-soluble primary, secondary or tertiary amine or ammonia; and
   curing the shell of the microcapsules at a temperature above 50° C.

* * * * *